United States Patent
Itou

(10) Patent No.: US 11,888,399 B2
(45) Date of Patent: Jan. 30, 2024

(54) POWER MANAGEMENT CIRCUIT

(71) Applicant: ROHM CO., LTD., Kyoto (JP)

(72) Inventor: Kazunori Itou, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 301 days.

(21) Appl. No.: 17/319,661

(22) Filed: May 13, 2021

(65) Prior Publication Data
US 2021/0265914 A1  Aug. 26, 2021

Related U.S. Application Data

(63) Continuation of application No. PCT/JP2019/043404, filed on Nov. 6, 2019.

(30) Foreign Application Priority Data

Nov. 21, 2018  (JP) ................. 2018-218460

(51) Int. Cl.
H02M 3/158  (2006.01)
H02M 1/00  (2006.01)
(Continued)

(52) U.S. Cl.
CPC ....... *H02M 3/1584* (2013.01); *H02M 1/0003* (2021.05); *H02M 1/008* (2021.05);
(Continued)

(58) Field of Classification Search
CPC .. H02M 3/1584; H02M 1/008; H02M 1/0009; H02M 1/08; H02M 1/32
See application file for complete search history.

(56) References Cited

U.S. PATENT DOCUMENTS

2008/0238392 A1  10/2008  Cheung et al.
2012/0256659 A1*  10/2012  Kiadeh ............... H02M 3/1584
                                         327/108
(Continued)

FOREIGN PATENT DOCUMENTS

JP  2005110374 A  4/2005
JP  3738245 B2  1/2006
(Continued)

OTHER PUBLICATIONS

International Search Report for International Application No. PCT/JP2019/043404; dated Jan. 28, 2020.
(Continued)

*Primary Examiner* — Alex Torres-Rivera
(74) *Attorney, Agent, or Firm* — CANTOR COLBURN LLP

(57) ABSTRACT

In a first mode, a first feedback controller generates a first control signal $S_{CTRL1}$ based on a signal at a first feedback pin, so as to control a first pre-driver. A second feedback controller ¥ generates a second control signal based on a signal at a second feedback pin, so as to control a second pre-driver. In a second mode, the first feedback controller ¥ generates the first control signal based on a signal at the first feedback pin, so as to control the first pre-driver. The second pre-driver drives the second pre-driver based on a third control signal received from a first circuit block.

20 Claims, 10 Drawing Sheets

(51) Int. Cl.
*H02M 1/08* (2006.01)
*H02M 1/32* (2007.01)

(52) U.S. Cl.
CPC .......... *H02M 1/0009* (2021.05); *H02M 1/08* (2013.01); *H02M 1/32* (2013.01)

(56) References Cited

U.S. PATENT DOCUMENTS

| | | | |
|---|---|---|---|
| 2015/0188427 A1* | 7/2015 | Yorozu | H02M 3/1584 323/271 |
| 2016/0315539 A1 | 10/2016 | Lee et al. | |
| 2017/0229961 A1* | 8/2017 | Zhang | H02M 3/1584 |
| 2020/0021189 A1* | 1/2020 | Li | H02M 3/158 |

FOREIGN PATENT DOCUMENTS

| | | | |
|---|---|---|---|
| JP | 2006033990 A | 2/2006 |
| JP | 2009077501 A | 4/2009 |
| JP | 2009148066 A | 7/2009 |
| JP | 2013089060 A | 5/2013 |
| JP | 2018164253 A | 10/2018 |

OTHER PUBLICATIONS

International Preliminary Report on Patentability and Written Opinion of the International Searching Authority for corresponding International Application No. PCT/JP2019/043404; dated Jun. 3, 2021.
CNIPA Office Action for corresponding CN Application No. 2019800757807; dated Jun. 25, 2023.

\* cited by examiner

FIG. 8A
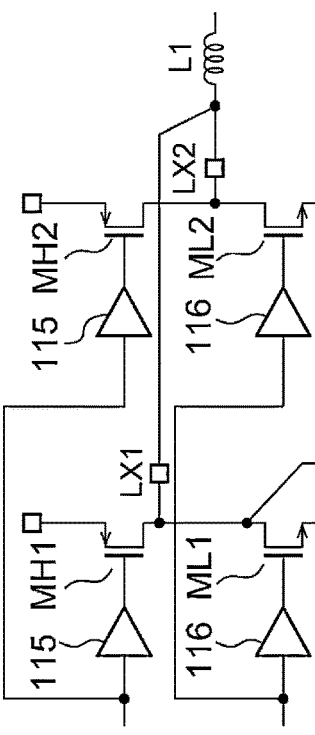
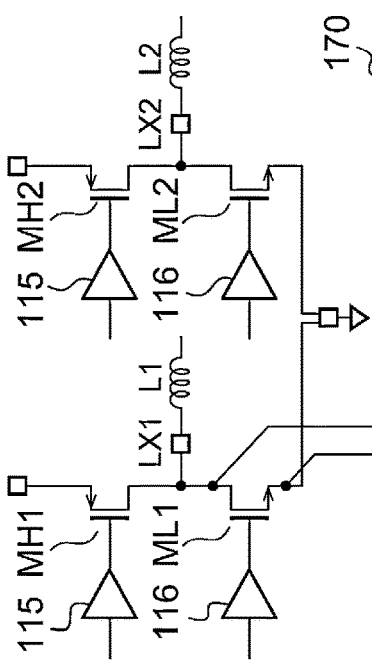
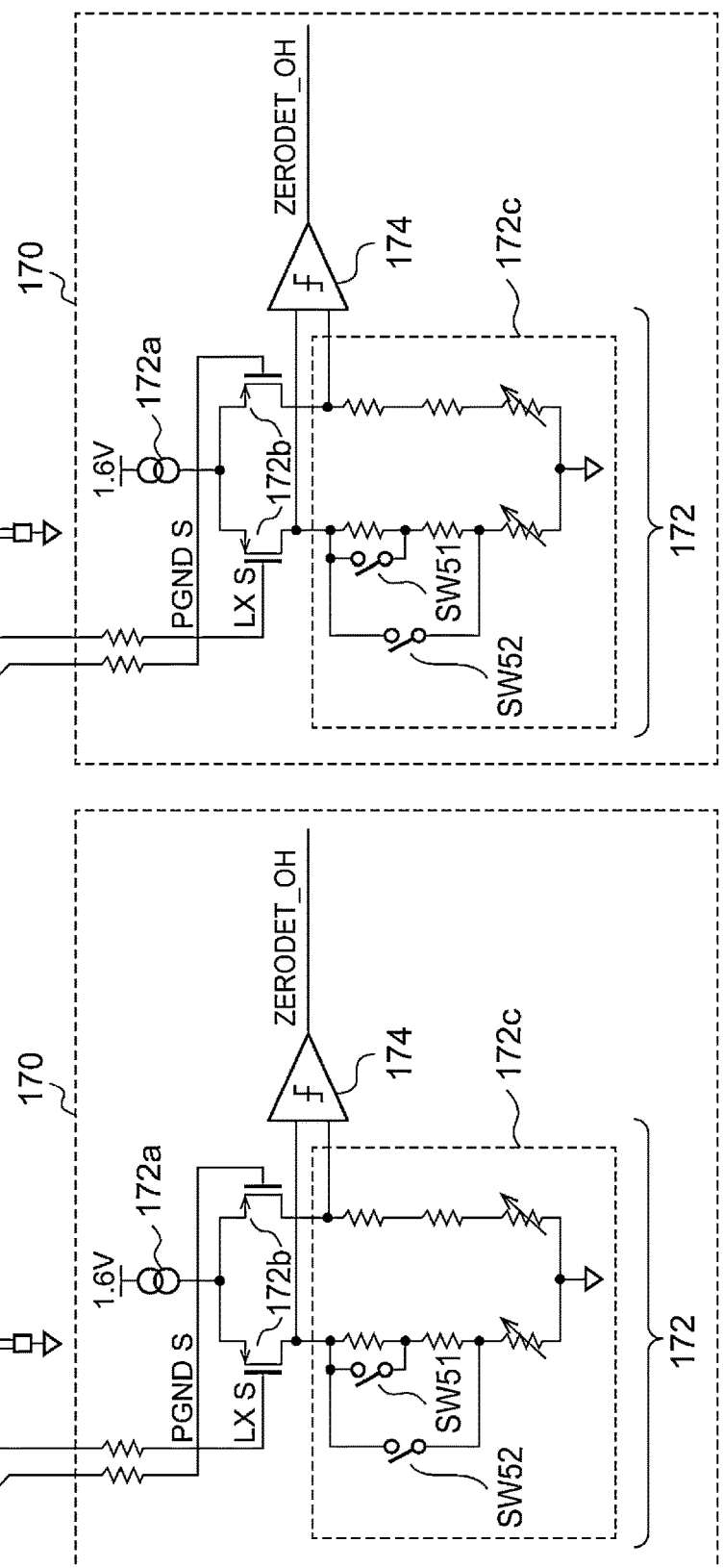
FIG. 8B

POWER MANAGEMENT CIRCUIT

CROSS-REFERENCE TO PRIOR APPLICATIONS

This application is a continuation under 35 U.S.C. § 120 of PCT/JP2019/043404, filed Nov. 6, 2019, which is incorporated herein reference and which claimed priority to Japanese Application No. 2018-218460, filed Nov. 21, 2018, the entire content of which is hereby incorporated by reference.

BACKGROUND

Technical Field

The present disclosure relates to a power management circuit.

Related Art

Electronic devices such as cellular phones, tablet terminals, laptop personal computers (PCs), game machines, etc., are each provided with a processing system including a processor such as a Central Processing Unit (CPU), Graphics Processing Unit (GPU), etc., and memory. In some cases, the processing system is configured as a single component as with a microcontroller or System on Chip (SoC).

With the increased demand for reduced power consumption, a processing system is divided into multiple circuit blocks, and is configured to allow each circuit block to receive a power supply voltage independently. In order to control multiple power supply systems that support multiple circuit blocks, a Power Management Integrated Circuit (PMIC) is employed. With the PMIC thus employed, this allows the on/off state and the output voltage setting level to be controlled with improved precision for each of the multiple power supplies according to a predetermined sequence. This provides improved system performance.

Conventionally, such a PMIC has been designed to be optimized for each platform. This leads to a situation in which a PMIC optimized for a particular platform cannot be employed for a different platform. Accordingly, in a case in which the expected shipment volume of a given platform is small, it is difficult to design a dedicated PMIC from the viewpoint of design cost recovery. In some cases, there has been no option but to abandon the employment of such a PMIC.

SUMMARY

The disclosure invention has been made in view of such a situation.

An embodiment of the present invention relates to a power management circuit. The power management circuit includes: a first feedback pin; a second feedback pin; a first circuit block including a first feedback controller and a first pre-driver; and a second circuit block including a second feedback controller and a second pre-driver. In a first mode, the first feedback controller generates a first control signal based on a signal at the first feedback pin. The first pre-driver operates according to the first control signal, the second feedback controller generates a second control signal based on a signal at the second feedback pin, and the second pre-driver operates according to the second control signal. In a second mode, the first feedback controller generates the first control signal based on a signal at the first feedback pin, the first pre-driver operates according to the first control signal, and the second pre-driver operates according to a third control signal received from the first circuit block.

It should be noted that any combination of the components described above, any component of the present invention, or any manifestation thereof may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8A and FIG. 8B are circuit diagrams each showing a low-side current detection circuit;

DETAILED DESCRIPTION

Overview of the Embodiments

Figure 1:
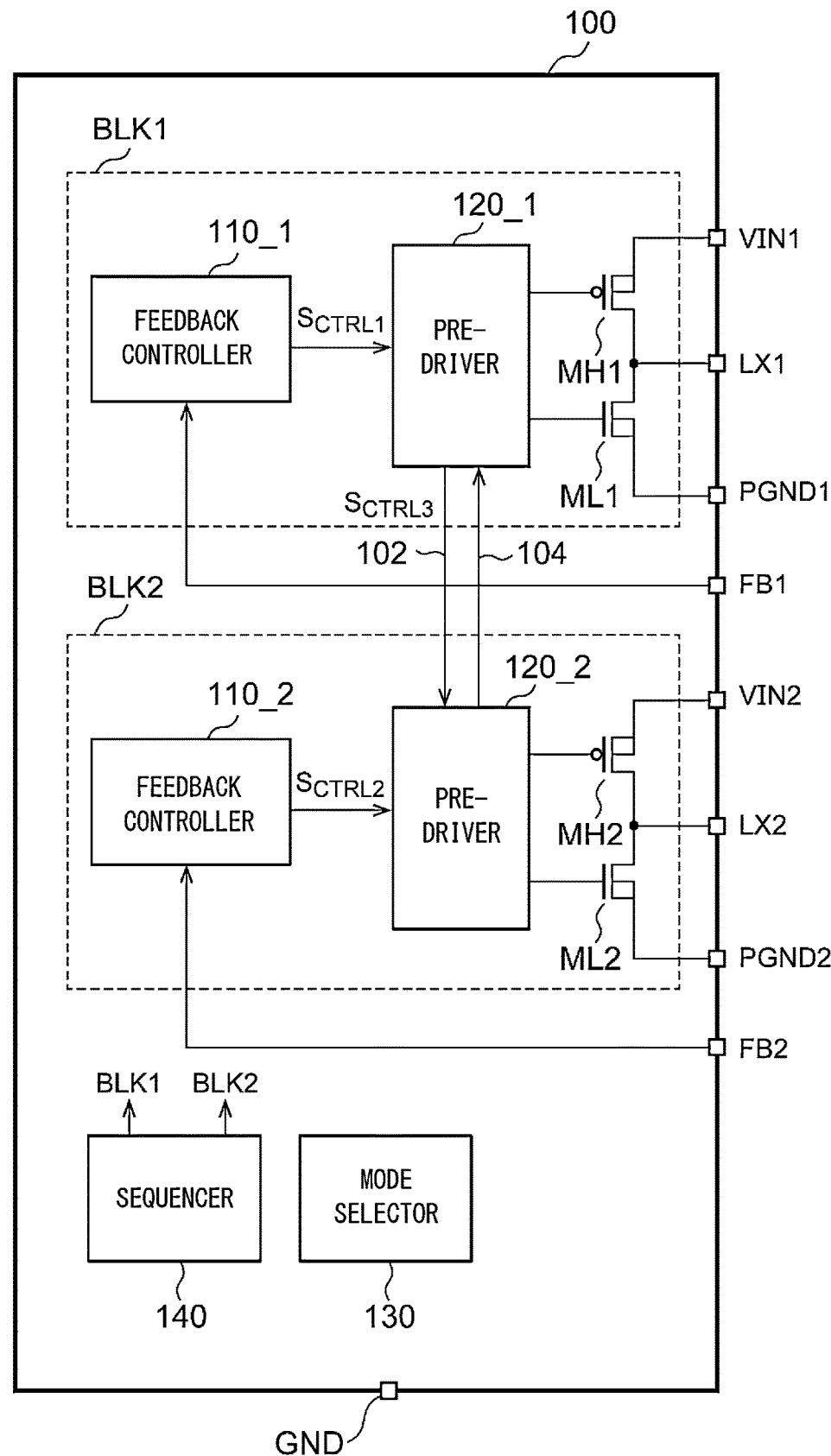
FIG. 1 is a block diagram showing a power management circuit according to an embodiment.

An embodiment disclosed in the present disclosure relates to a power management circuit. The power management circuit includes: a first feedback pin; a second feedback pin; a first circuit block including a first feedback controller and a first pre-driver; and a second circuit block including a second feedback controller and a second pre-driver. In a first mode, the first feedback controller generates a first control signal based on a signal at the first feedback pin. The first pre-driver operates according to the first control signal, the second feedback controller generates a second control signal based on a signal at the second feedback pin, and the second pre-driver operates according to the second control signal. In a second mode, the first feedback controller generates the first control signal based on a signal at the first feedback pin, the first pre-driver operates according to the first control signal, and the second pre-driver operates according to a third control signal received from the first circuit block.

A particular platform is set to the first mode. This allows the power management circuit to operate as a two-channel DC/DC converter. In contrast, another platform is set to the second mode. In this mode, two channels of output signals are combined as a single-channel output, which is coupled to a single inductor. This allows the power management circuit to operate as a single-channel DC/DC converter.

Also, in the second mode, the operation of the second feedback controller may be stopped. This allows power consumption to be reduced.

Also, the power management circuit may further include a mode selector structured to select one from among the first mode and the second mode based on an electrical state of the second feedback pin. With such an arrangement in which the second feedback pin is used for mode setting, this allows an increase in the number of pins required for the power management circuit to be suppressed.

Also, the first circuit block and the second circuit block may be structured as a single core. This allows the circuit to be designed in a simple manner.

Also, the power management circuit may further include a signal path structured to allow a signal for dead-time control to be transmitted between the first pre-driver and the second pre-driver in the second mode. This arrangement is capable of preventing the high-side transistor (low-side transistor) driven by the first pre-driver and the low-side transistor (high-side transistor) driven by the second pre-driver from turning on at the same time.

Also, the power management circuit may further include: a first input pin; a first output pin; a first ground pin; a second input pin; a second output pin; and a second ground pin. The first circuit block may further include: a first high-side transistor arranged between the first input pin and the first output pin; and a first low-side transistor arranged between the first output pin and the first ground pin. Also, the second circuit block may further include: a second high-side transistor arranged between the second input pin and the second output pin; and a second low-side transistor arranged between the second output pin and the second ground pin.

Also, the power management circuit may further include: a first overcurrent detection circuit structured to compare a current that flows through the first high-side transistor with a first overcurrent threshold value; and a second overcurrent detection circuit structured to compare a current that flows through the second high-side transistor with a second overcurrent threshold value. Also, in the first mode, the first overcurrent detection circuit and the second overcurrent detection circuit may be enabled. Also, in the second mode, the first overcurrent detection circuit may be enabled, and the second overcurrent detection circuit may be disabled. With such an arrangement in which, in the second mode, only the first overcurrent detection circuit is enabled, this allows power consumption to be reduced.

In the second mode, both the first overcurrent detection circuit and the second overcurrent detection circuit may operate. In this case, a protection operation may be executed based on an output of the overcurrent detection circuit that has detected an overcurrent in an earlier stage.

Also, the first overcurrent detection circuit may be structured to be capable of comparing a voltage across both ends of the first high-side transistor with a first threshold voltage that corresponds to the first overcurrent threshold value. Also, in the second mode, the first threshold voltage may be scaled. In the second mode, the two high-side transistor are coupled in parallel. In this state, the on resistance of the pair of high-side transistors becomes one-half. The first threshold voltage is scaled according to this change in the on resistance, thereby providing correct overcurrent judgment.

Also, the first overcurrent detection circuit may include: a dummy transistor arranged such that one end thereof is coupled to the first input pin; a current source coupled to the other end of the dummy transistor, and structured to supply a current to the dummy transistor; and a comparator structured to compare a voltage across both ends of the first high-side transistor with a voltage at a connection node that connects the dummy transistor and the current source.

Also, there may be a difference in an amount of current generated by the current source between the first mode and the second mode. This allows the first overcurrent threshold value to be scaled.

Also, the power management circuit may further include: a first peak current detection circuit structured to compare a current that flows through the first high-side transistor with a first peak threshold value; and a second peak current detection circuit structured to compare a current that flows through the second high-side transistor with a second peak threshold value. In the first mode, the first peak current detection circuit and the second peak current detection circuit may be enabled. Also, in the second mode, the first peak current detection circuit may be enabled, and the second peak current detection circuit may be disabled. Also, the first peak threshold value may be scaled. In the second mode, only the first peak current detection circuit is enabled, thereby allowing power consumption to be reduced.

In the second mode, both the first peak current detection circuit and the second peak current detection circuit may operate. In this case, the output of the one from among them that shows a quicker response may be used for a protection operation or a feedback control operation.

Also, the first peak current detection circuit may be structured to be capable of comparing a voltage across both ends of the first high-side transistor with a second threshold voltage that corresponds to the first peak threshold value. Also, in the second mode, the second threshold voltage may be scaled. In the second mode, the two high-side transistor are coupled in parallel. In this state, the on resistance of the pair of high-side transistors becomes one-half. The second threshold voltage is scaled according to this change in the on resistance, thereby providing correct peak current detection.

Also, the first peak current detection circuit may include: a dummy transistor arranged such that one end thereof is coupled to the first input pin; a current source coupled to the other end of the dummy transistor, and structured to supply a current to the dummy transistor; and a comparator structured to compare a voltage across both ends of the first high-side transistor with a voltage at a connection node that connects the dummy transistor and the current source.

Also, the dummy transistor may include multiple transistor elements coupled in series. Also, in the second mode, a part of the multiple transistor elements may be bypassed. This allows the first peak threshold value to be scaled.

Also, the power management circuit may further include a low-side current detection circuit structured to compare a current that flows through the first low-side transistor with a threshold value of zero or a negative value in the vicinity of zero. Also, in the first mode, the first feedback controller and the second feedback controller may respectively generate the first control signal and the second control signal according to an output of the low-side current detection circuit. Also, in the second mode, the first feedback controller may generate the first control signal according to an output of the low-side current detection circuit. In a light load state, the output of the low-side current detection circuit is used to operate the power management circuit in a diode rectification mode. This mode is mainly employed for providing improved efficiency. Alternatively, the output of the low-side current detection circuit is used for Negative Current Protection (NCP) configured to limit a negative current such that it does not become excessively large. Such functions do not require as severe a precision as the overcurrent detection. Accordingly, with such an arrangement in which only the current that flows through the first low-side transistor is monitored regardless of the mode, this allows power consumption to be reduced.

Also, the threshold value for zero-crossing detection may be shifted according to switching between the first mode and the second mode.

Also, the first ground pin and the second ground pin may be configured as a common ground pin. This allows the number of pins to be reduced.

Also, the first output stage including the first high-side transistor and the first low-side transistor of the first circuit block and the second output stage including the second high-side transistor and the second low-side transistor of the second circuit block may be laid out such that they are mirror images of each other. This provides the circuit with improved symmetry, thereby allowing the two output stages to operate with uniformity in the second mode. The first ground pin and the second ground pin may be configured as a common ground pin.

Also, a portion including the first output stage and the first pre-driver and a portion including the second output stage and the second pre-driver may be configured as a single core. Also, such components may be laid out such that they are mirror images of each other. With such a symmetrical arrangement including the pre-drivers, this provides improved uniformity of operation.

EMBODIMENTS

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

FIG. 1 is a block diagram showing a power management circuit 100 according to an embodiment. A power management circuit 100 includes a first input (VIN1) pin, a first output (LX1) pin, a first ground (PGND1) pin, a first feedback (FB1) pin, a second input (VIN2) pin, a second output (LX2) pin, a second ground (PGND2) pin, a second feedback (FB2) pin, and a ground (GND) pin, which are housed in a single package.

The power management circuit 100 includes a first feedback controller 110_1, a second feedback controller 110_2, a first pre-driver 120_1, a second pre-driver 120_2, a first high-side transistor MH1, a first low-side transistor ML1, a second high-side transistor MH2, a second low-side transistor ML2, a mode selector 130, and a sequencer 140.

The power management circuit 100 is configured to be selectively set to a first mode or a second mode. The first mode or the second mode is fixedly set for a platform on which the power management circuit 100 is mounted. The mode selector 130 selects one from among the first mode and the second mode according to external settings.

The first feedback controller 110_1, the first pre-driver 120_1, the first high-side transistor MH1, and the first low-side transistor ML1 form a first circuit block BLK1. Furthermore, the second feedback controller 110_2, the second pre-driver 120_2, the second high-side transistor MH2, and the second low-side transistor ML2 form a second circuit block BLK2. The first circuit block BLK1 and the second circuit block BLK2 can be configured as a single core. Accordingly, the feedback controllers 110_1 and 110_2 have the same function and the same configuration, and the pre-drivers 120_1 and 120_2 have the same function and the same configuration. Furthermore, the first high-side transistor MH1 and the second high-side transistor MH2 have the same size. The first low-side transistor ML1 and the second low-side transistor ML2 have the same size.

The sequencer 140 controls the start/stop timings for each of the first circuit block BLK1 and the second circuit block BLK2.

First Mode

The first mode is a mode in which the first circuit block BLK1 and the second circuit block BLK2 operate completely independently. The power management circuit 100 forms a DC/DC converter having two outputs (two channels) together with external components.

In the first mode, a feedback signal $V_{FB1}$ that corresponds to an output signal of the first-channel DC/DC converter is fed back to the FB1 pin. Furthermore, a feedback signal $V_{FB2}$ that corresponds to the second-channel DC/DC converter is fed back to the FB2 pin. The first feedback controller 110_1 generates a first control signal $S_{CTRL1}$ based on the feedback signal $V_{FB1}$ input to the FB1 pin. Furthermore, the second feedback controller 110_2 generates a second control signal $S_{CTRL2}$ based on the feedback signal $V_{FB2}$ input to the FB2 pin.

The configuration and the control method employed in the feedback controller 110 are not restricted in particular. For example, the feedback controller 110 may be configured as a voltage-mode controller. Also, the feedback controller 110 may be configured as a peak-current-mode or an average-current-mode controller. Alternatively, the feedback controller 110 may be configured as a ripple-control controller using a hysteresis control (Bang-Bang control) method, bottom detection on-time fixed control method, peak detection off-time fixed control method, or the like.

The first pre-driver 120_1 operates according to the first control signal $S_{CTRL1}$. The second pre-driver 120_2 operates according to the second control signal $S_{CTRL2}$. Specifically, the first pre-driver 120_1 drives the first high-side transistor MH1 and the first low-side transistor ML1 according to the first control signal $S_{CTRL1}$. The second pre-driver 120_2 drives the second high-side transistor MH2 and the second low-side transistor ML2 according to the second control signal $S_{CTRL2}$. The first control signal $S_{CTRL1}$ includes at least a pulse signal for defining the duty ratio (or on time) of the first high-side transistor MH1. The second control signal $S_{CTRL2}$ includes at least a pulse signal for defining the duty ratio (or on time) of the second high-side transistor MH2.

In the first mode, the sequencer 140 starts up the first circuit block BLK1 and the second circuit block BLK2 at different timings with a system startup instruction or the turning-on of the power supply as a trigger. Also, with an application that supports a sleep mode, standby mode, or the like, such an arrangement may be capable of disabling only one from among the output of the first circuit block BLK1 and the output of the second circuit block BLK2 according to an instruction received from a host processor. Also, upon receiving a system stop instruction, the first circuit block BLK1 and the second circuit block BLK2 are stopped at different timings. The startup timing and the stop timing for each of the two blocks BLK1 and BLK2 may be settable by means of a register.

Second Mode

In the second mode, the power management circuit 100 forms a single-output (single-channel) DC/DC converter together with external components. Specifically, a common inductor is coupled to the LX1 pin and the LX2 pin. Furthermore, a pair of the first high-side transistor MH1 and the second high-side transistor MH2 are electrically coupled in parallel. Moreover, a pair of the first low-side transistor ML1 and the second low-side transistor ML2 are electrically coupled in parallel.

In the second mode, a feedback signal $V_{FB1}$ that corresponds to the output signal of the common DC/DC converter is fed back to the FB1 pin. The FB2 pin may be set to a non-connection (NC) state. Also, as described later, the FB2 pin may be employed as a pin for setting the mode.

In the second mode, the first feedback controller 110_1 generates the first control signal $S_{CTRL1}$ based on the signal input to the FB1 pin. The operation of the second feedback controller 110_2 is stopped. The first feedback controller 110_1 and the second circuit block BLK2 (second pre-driver 120_2) are coupled via a signal path 102. This allows a third control signal $S_{CTRL3}$ to be supplied to the second pre-driver 120_2 via the signal path 102. For example, the third control signal $S_{CTRL3}$ may include a replica of a high-side pulse signal configured as an instruction to turn on and off the first high-side transistor MH1 and a replica of a low-side pulse signal configured as an instruction to turn on and off the first low-side transistor ML1.

The first pre-driver 120_1 operates according to the first control signal $S_{CTRL1}$. Furthermore, the second pre-driver 120_2 operates according to the third control signal $S_{CTRL3}$ received from the first feedback controller 110_1 instead of the second control signal $S_{CTRL2}$.

With this, the first high-side transistor MH1 and the second high-side transistor MH2 turn on and off at substantially the same time. Furthermore, the first low-side transistor ML1 and the second low-side transistor ML2 turn on and off at substantially the same time.

A fourth control signal $S_{CTRL4}$ supplied from the second pre-driver 120_2 to the first pre-driver 120_1 includes a signal that indicates the on/off state of the second high-side transistor MH2 and a signal that indicates the on/off state of the second low-side transistor ML2. The first pre-driver 120_1 is allowed to turn on the first low-side transistor ML1 after the completion of the turning-off of the first high-side transistor MH1 and the second high-side transistor MH2. Furthermore, the first pre-driver 120_1 is allowed to turn on the first high-side transistor MH1 after the completion of the turning-off of the first low-side transistor ML1 and the second low-side transistor ML2.

The power management circuit 100 includes a signal path 104 for transmitting the control signal $S_{CTRL4}$ between the first pre-driver 120_1 and the second pre-driver 120_2 for supporting dead-time control (for preventing through current) in the second mode. This ensures that the high-side transistors MH1 and MH2 turn on after both the first low-side transistor ML1 and the second low-side transistor ML2 are turned off. Furthermore, this arrangement ensures that the first low-side transistor ML1 and the second low-side transistor ML2 are turned on after both the high-side transistors MH1 and MH2 are turned off.

In the second mode, the first circuit block BLK1 and the second circuit block BLK2 form a single channel. Accordingly, the sequencer 140 starts up the first circuit block BLK1 and the second circuit block BLK2 at the same timing with a system startup instruction or the turning-on of the power supply as a trigger. Furthermore, upon receiving a system stop instruction, the first circuit block BLK1 and the second circuit block BLK2 are stopped.

The above is the configuration of the power management circuit 100. Next, description will be made regarding the operation thereof.

Figure 2:
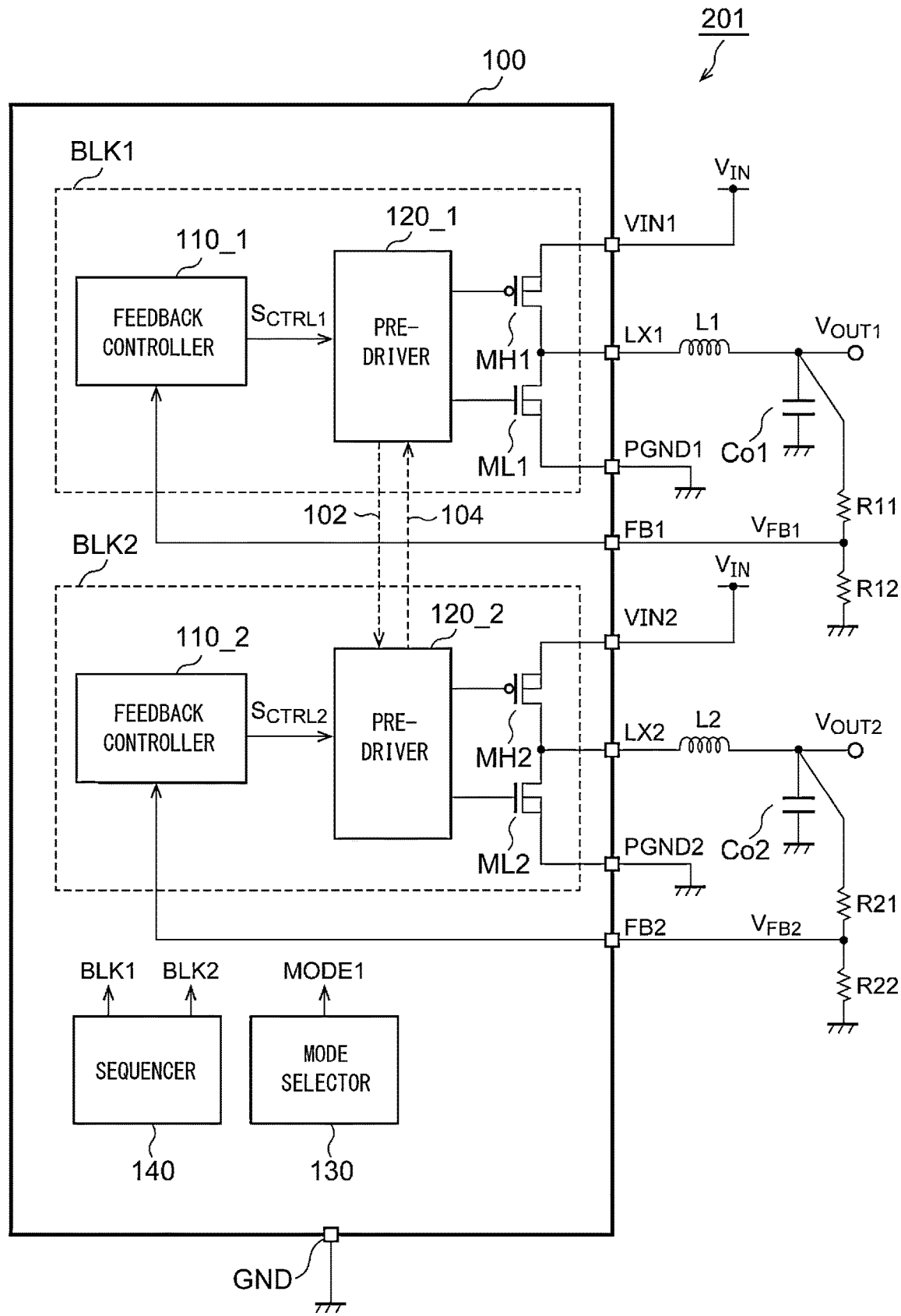
FIG. 2 is a block diagram showing a first system including a power management circuit.

FIG. 2 is a block diagram showing a first system 201 provided with the power management circuit 100. With the system 201, the power management circuit 100 is set to the first mode. An inductor L1 and an output capacitor Co1 are coupled to the LX1 pin, which forms a DC/DC converter with a first channel CH1. A resistive voltage dividing circuit formed of R11 and R12 is coupled to the FB1 pin. A feedback signal $V_{FB1}$ that corresponds to the output voltage $V_{OUT1}$ is fed back to the FB1 pin. In the first mode, the signal paths 102 and 104 are not used.

An inductor L2 and an output capacitor Co2 are coupled to the LX2 pin, which forms a DC/DC converter with a second channel CH2. A resistive voltage dividing circuit formed of R21 and R22 is coupled to the FB2 pin. A feedback signal $V_{FB2}$ that corresponds to the output voltage $V_{OUT2}$ is fed back to the FB2 pin. The resistors R11, R12, R21, and R22 may be built into the power management circuit 100. Alternatively, in a case in which the target value of the output voltage $V_{OUT}$ is low, the output voltage $V_{OUT}$ may be directly input to the FB pin.

The first circuit block BLK1 provides a feedback control operation such that the feedback signal $V_{FB1}$ approaches the reference voltage $V_{REF1}$, thereby stabilizing the output voltage $V_{OUT1}$ to the target voltage $V_{OUT1(REF)}$. Similarly, the second circuit block BLK2 provides a feedback control operation such that the feedback signal $V_{FB2}$ approaches the reference voltage $V_{REF2}$, thereby stabilizing the output voltage $V_{OUT2}$ to the target voltage $V_{OUT2(REF)}$.

Figure 3:
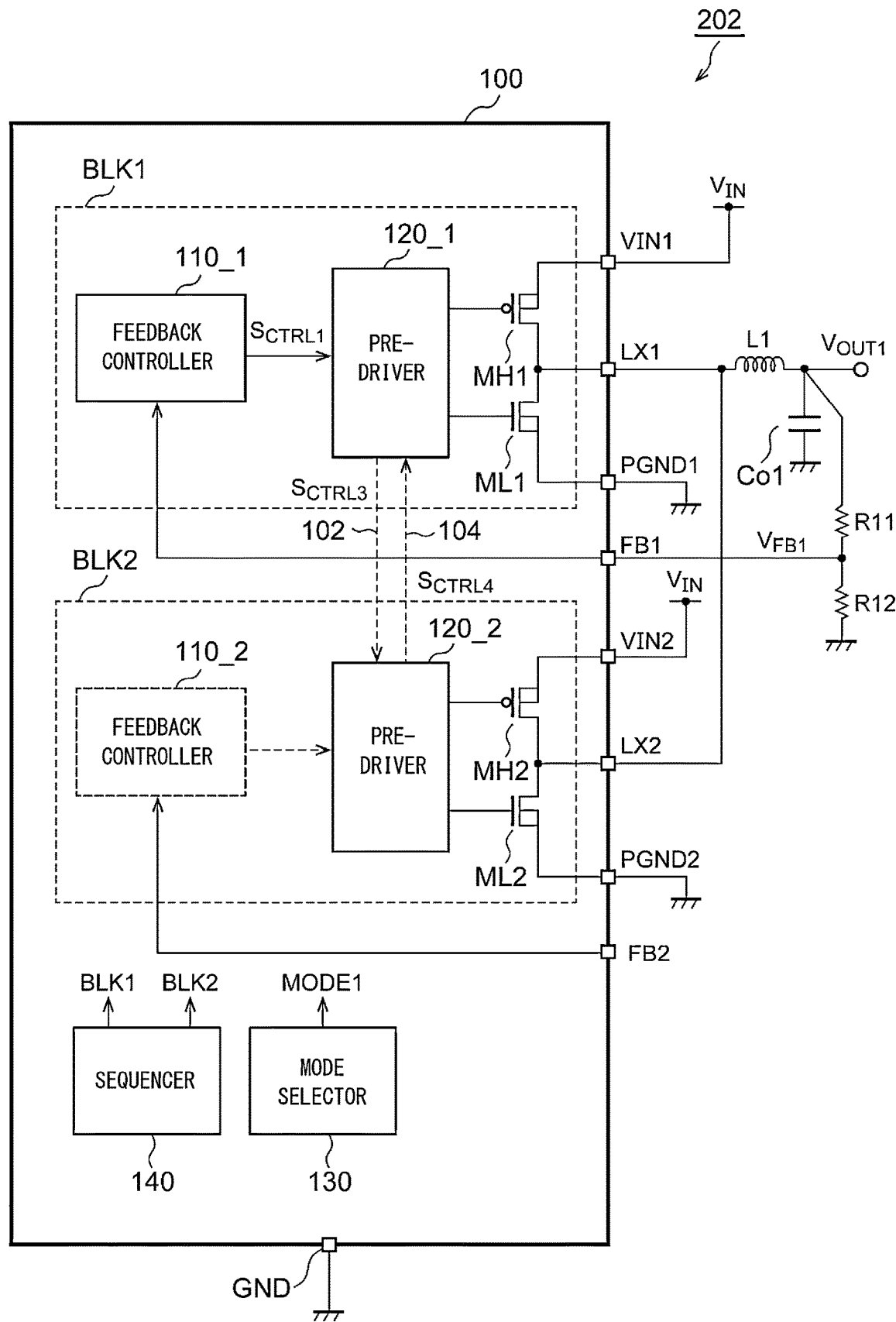
FIG. 3 is a block diagram showing a second system including a power management circuit.

FIG. 3 is a block diagram showing a second system 202 provided with the power management circuit 100. With the system 202, the power management circuit 100 is set to the second mode. A common inductor L1 is coupled to the LX1 pin and the LX2 pin, which forms a single-channel DC/DC converter.

In the second mode, the first block BLK1 operates as a master, and the second circuit block BLK2 operates as a slave. A resistive voltage dividing circuit formed of R11 and R12 is coupled to the FB1 pin. A feedback signal $V_{FB1}$ that corresponds to the output voltage $V_{OUT1}$ is fed back to the FB1 pin. In the second mode, the second feedback controller 110_2 may be stopped so as to stop the generation of the second control signal $S_{CTRL2}$. This allows power consumption to be reduced. The second pre-driver 120_2 drives the second high-side transistor MH2 and the second low-side transistor ML2 based on the third control signal $S_{CTRL3}$ supplied from the first feedback controller 110_1. With this, the output voltage $V_{OUT1}$ is stabilized to the target voltage $V_{OUT1(REF)}$. It should be noted that, in the second mode, the operation of the second feedback controller 110_2 may be maintained while the second control signal $S_{CTRL2}$ is not used.

The above is the operation of the power management circuit 100. With the power management circuit 100, in a case of supporting a particular platform, the power management circuit 100 may be set to the first mode such that it functions as a two-channel DC/DC converter. Furthermore, in a case of supporting a different platform, the power management circuit 100 may be set to the second mode. In the second mode, two channels of output signals are combined as a single-channel output, which is coupled to a single inductor, thereby allowing the power management circuit 100 to operate as a single-channel DC/DC converter. In the second mode, the first high-side transistor MH1 and the second high-side transistor MH2 are coupled in parallel. Furthermore, the first low-side transistor ML1 and the second low-side transistor ML2 are coupled in parallel. This provides improved current supply capacity. Accordingly, this allows the power management circuit 100 to function as a power supply for a heavy load (a load that operates with a large operating current) as compared with the first mode.

The present disclosure encompasses various kinds of apparatuses and circuits that can be regarded as a block configuration or a circuit configuration shown in FIG. 1, or otherwise that can be derived from the aforementioned description. That is to say, the present disclosure is not restricted to a specific configuration. More specific description will be made below regarding example configurations and examples for clarification and ease of understanding of the essence of the present disclosure and the operation thereof. That is to say, the following description will by no means be intended to restrict the technical scope of the present disclosure.

Mode Selection

Figure 4:
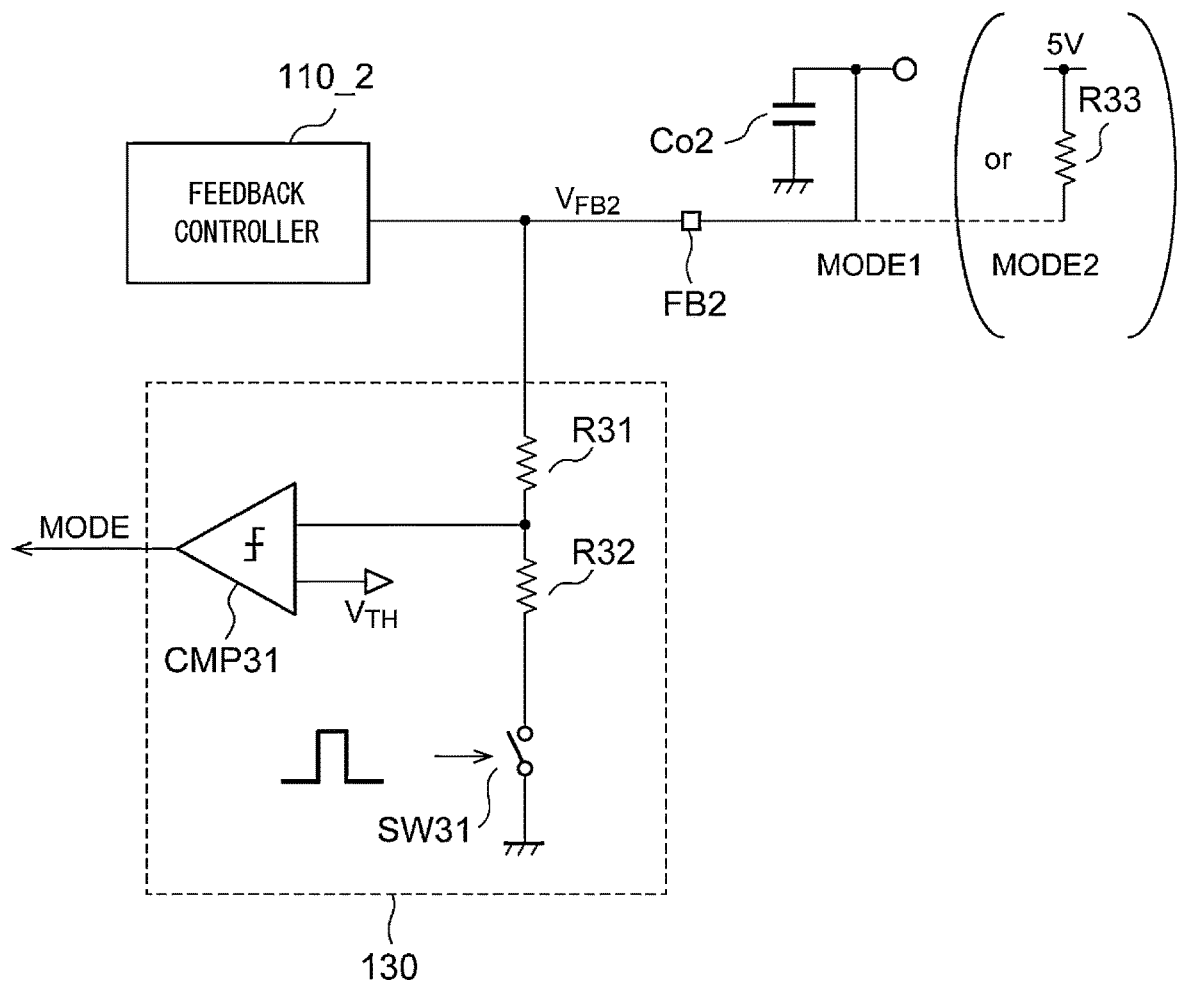
FIG. 4 is a circuit diagram showing an example configuration of a mode selector.

The second feedback pin FB2 may be used for mode selection. FIG. 4 is a circuit diagram showing an example configuration of a mode selector 130. The mode selector 130 includes resistors R31 and R32 arranged between the FB2 pin and the ground, a switch SW31, and a comparator CMP31. During a judgment period immediately after the startup of the power management circuit 100, the switch SW31 is turned on. After the judgment, the switch SW3 is turned off. This arrangement is capable of preventing wasted current from flowing via the resistors R31 and R32.

With an application (system) to be set to the first mode MODE1, the FB2 pin is coupled to the output capacitor Co2 directly or via a resistive voltage dividing circuit. When the mode is judged, the output voltage $V_{OUT2}$ is zero, and accordingly, the voltage $V_{FB2}$ applied to the FB2 pin is zero. Accordingly, the comparator CMP31 judges that $V_{FB2}<V_{TH}$. In this case, a mode signal MODE is set to a level (e.g., high level) that indicates the first mode.

With an application (system) to be set to the second mode MODE2, the FB2 pin is set such that it is pulled up to a high-level voltage (e.g., power supply voltage on the order of 5 V or other voltages) via a resistor R33. In the mode judgment operation, the switch SW31 is turned on. In this state, a voltage that is proportional to the high-level voltage of 5 V is input to the comparator CMP31. As a result, the comparator CMP31 judges that $V_{FB2}>V_{TH}$. In this case, the mode signal MODE is set to a level (e.g., low level) that indicates the second mode.

With the mode selector 130, the mode can be set using the FB2 pin. This provides an advantage of requiring no additional pin for mode setting.

In a case in which there is a surplus number of pins, an additional function, i.e., a function for mode setting, may be assigned to a vacant pin. With this, the mode may be set according to the electrical state of the mode-setting pin. Alternatively, an arrangement may be made in which mode-setting data is written to a register included in the power management circuit 100 from an external circuit. Alternatively, the power management circuit 100 is provided with nonvolatile memory for mode setting. With this, when the power management circuit 100 is started up, the nonvolatile memory may be accessed in order to judge the mode.

Pre-Driver

Figure 5:
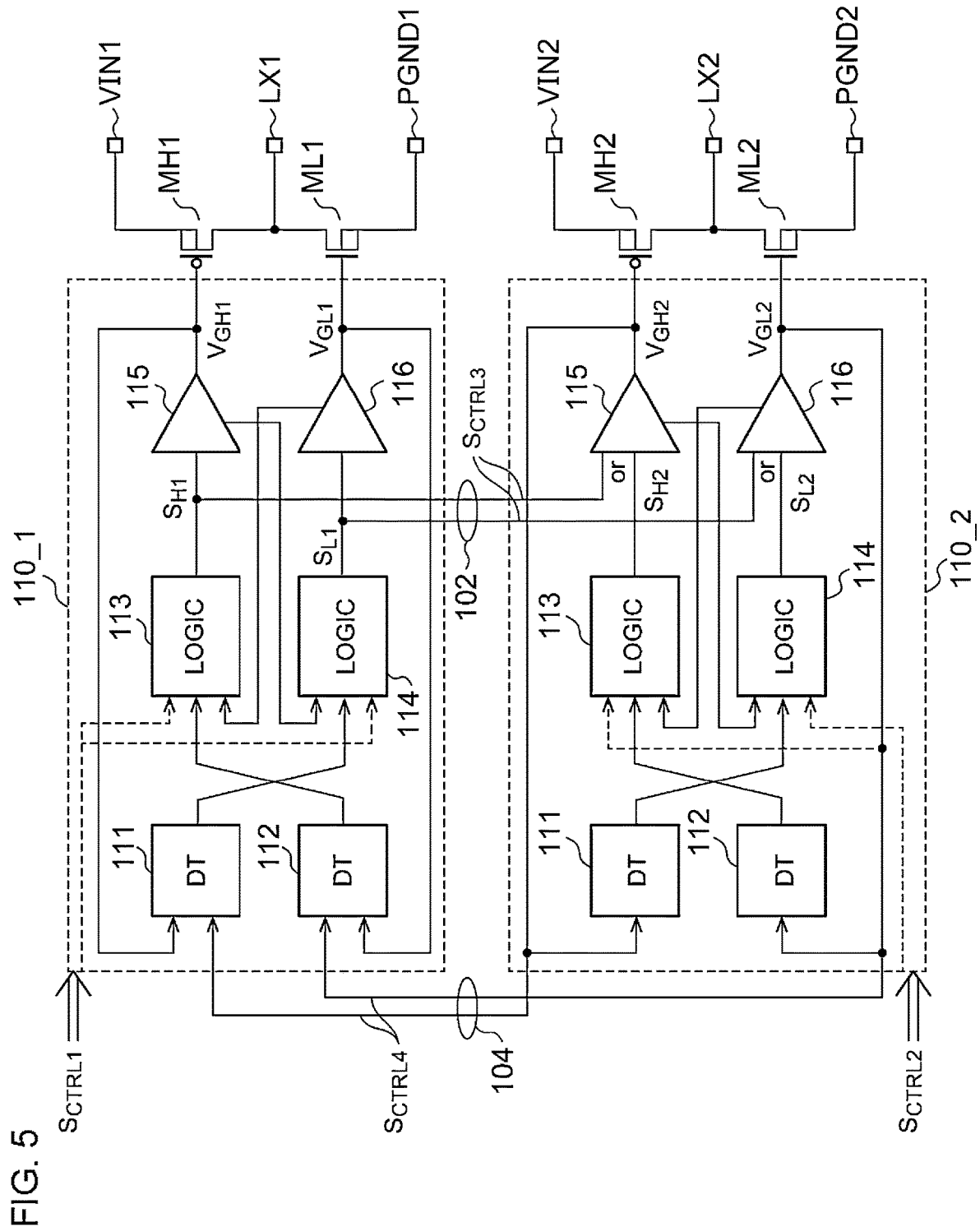
FIG. 5 is a block diagram showing an example configuration of a first pre-driver and a second pre-driver.

FIG. 5 is a block diagram showing example configurations of the first pre-driver and the second pre-driver. First, description will be made regarding the first feedback controller 110_1. The first feedback controller 110_1 includes a dead-time controller 111, dead-time controller 112, control logic 113, control logic 114, buffer 115, and buffer 116.

The control logics 113 and 114 generate control pulses $S_{H1}$ and $S_{L1}$ configured as an instruction to turn on and off the high-side transistor MH1 and an instruction to turn on and off the low-side transistor ML1, respectively, based on the control signal $S_{CTRL1}$.

The buffer 115 arranged on the first feedback controller 110_1 side drives the first high-side transistor MH1 based on the control pulse $S_{H1}$. The buffer 116 arranged on the first feedback controller 110_1 side drives the first low-side transistor ML1 based on the control pulse $S_{L1}$. In the second mode, the third control signal $S_{CTRL3}$ including the replicas of the control pulses $S_{H1}$ and $S_{L1}$ is supplied to the second feedback controller 110_2 via the signal path 102.

In order to prevent through current from passing through the first high-side transistor MH1 and the second high-side transistor MH2, the control logic 113 monitors a signal that occurs at an internal node of the buffer 116. With this, during a period in which the first low-side transistor ML1 is instructed to be turned on, the control pulse $S_{H1}$ is fixedly set to the off level. Similarly, the control logic 114 monitors a signal that occurs at an internal node of the buffer 115. With this, during a period in which the first high-side transistor MH1 is instructed to be turned on, the control pulse $S_{L1}$ is fixedly set to the off level.

In the second mode, in order to provide dead-time control, the gate signal $V_{GH2}$ of the second high-side transistor MH2 and the gate signal $V_{GL2}$ of the second low-side transistor ML2 are supplied as a fourth control signal $S_{CTRL4}$ to the first feedback controller 110_1.

The dead-time controller 111 receives the input of the gate pulse $V_{GH1}$ of the first high-side transistor MH1 (and furthermore, receives the gate pulse $V_{GH2}$ of the second high-side transistor MH2 in the second mode).

In the first mode, the dead-time controller 111 sets a predetermined period after the transition of the gate signal $V_{GH1}$ to the high level (off level) as a dead time. During the dead time, the control pulse $S_{L1}$ is fixedly set to the off level.

In the second mode, the dead-time controller 111 sets a predetermined period after the transition of both the gate signals $V_{GH1}$ and $V_{GH2}$ to the high level (off level) as a dead time. During the dead time, the control pulse $S_{H1}$ is fixedly set to the off level.

The dead-time controller 112 receives the input of the gate pulse $V_{GL1}$ of the first low-side transistor ML1 (and furthermore, receives the gate pulse $V_{GL2}$ of the second low-side transistor ML2 in the second mode).

In the first mode, the dead-time controller 112 sets a predetermined period after the transition of the gate signal $V_{GL1}$ to the low level (off level) as a dead time. During the dead time, the control pulse $S_{L1}$ is fixedly set to the off level.

In the second mode, the dead-time controller 112 sets a predetermined period after the transition of both the gate signals $V_{GL1}$ and $V_{GL2}$ to the low level (off level) as a dead time. During the dead time, the control pulse $S_{L1}$ is fixedly set to the off level.

The second feedback controller 110_2 has the same configuration as that of the first feedback controller 100_1. In the first mode, the second feedback controller 110_2 operates in the same manner as the first feedback controller 110_1. However, in the second mode, the dead-time controllers 111 and 112 and the control logics 113 and 114 are stopped. In the second mode, the control signal $S_{CTRL3}$ including the control pulses $S_{H1}$ and $S_{L1}$ is supplied from the first feedback controller 110_1 to the second feedback controller 110_2. In the second mode, the buffer 115 drives the second high-side transistor MH2 based on the control pulse $S_{H1}$. Furthermore, the buffer 116 drives the second low-side transistor ML2 based on the control pulse $S_{L1}$.

It can be understood by those skilled in this art that the configuration of the feedback controller 110 is not restricted to such an example shown in FIG. 5.

Overcurrent Protection

Figure 6A:
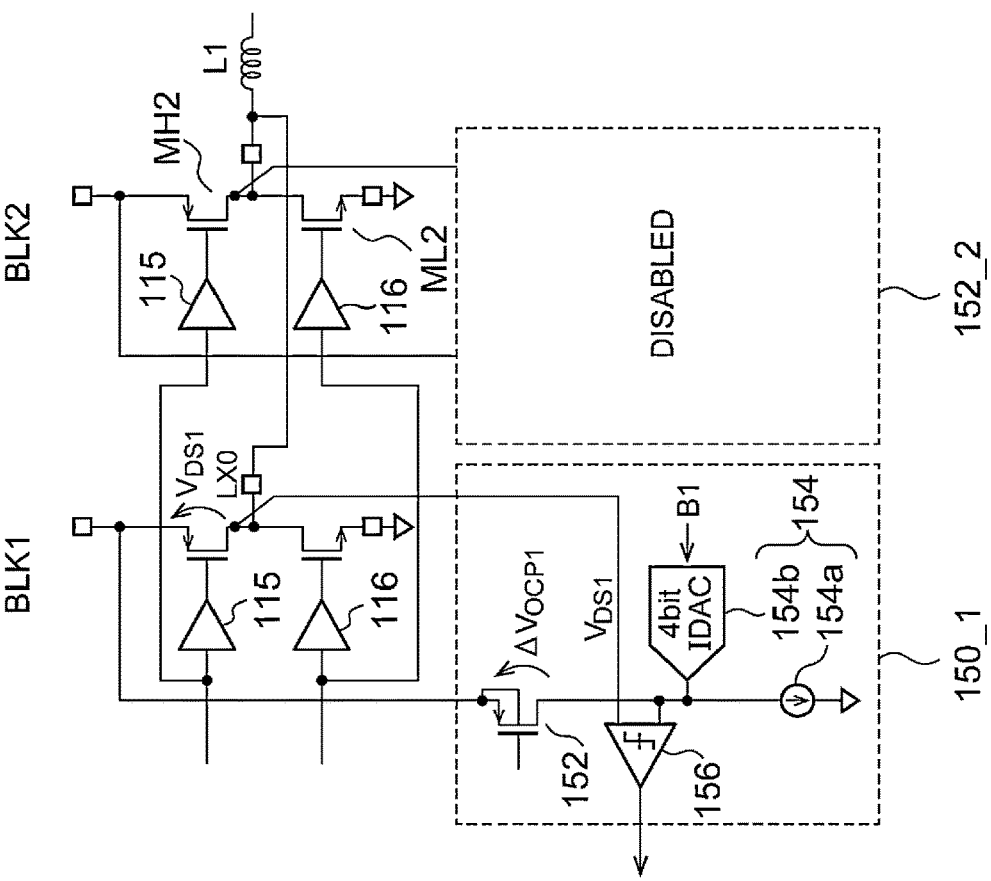
FIG. 6A and FIG. 6B are circuit diagrams each showing an overcurrent protection circuit.
Figure 6B:
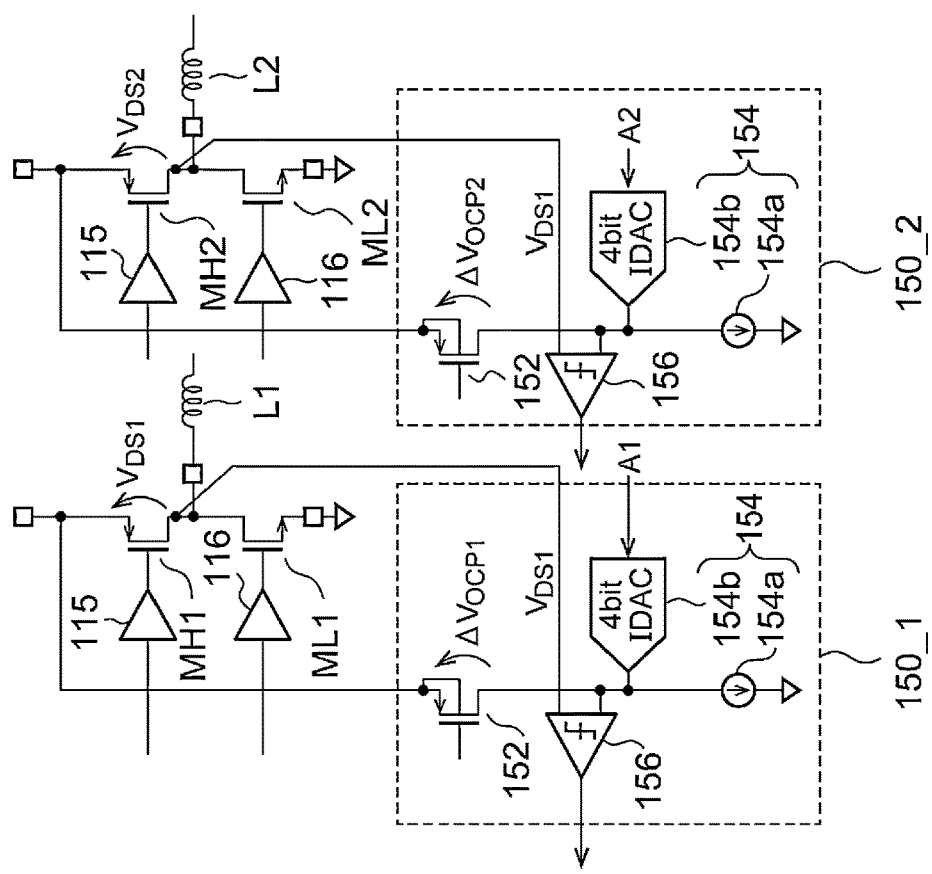

FIG. 6A and FIG. 6B are circuit diagrams each showing an overcurrent protection circuit. FIG. 6A shows a state in the first mode, and FIG. 6B shows a state in the second mode. The first circuit block BLK1 and the second circuit block BLK2 each include a first overcurrent detection circuit 150_1 and a second overcurrent detection circuit 150_2.

The first overcurrent detection circuit 150_1 compares a current $I_{MH1}$ that flows through the first high-side transistor MH1 with a first overcurrent threshold value $I_{OCP1}$. The second overcurrent detection circuit 150_2 compares a current $I_{MH2}$ that flows through the second high-side transistor MH2 with a second overcurrent threshold value $I_{OCP2}$. In the first mode, both the first overcurrent detection circuit 150_1 and the second overcurrent detection circuit 150_2 are enabled. In this state, each circuit block BLK_# ("#"=1, 2) executes overcurrent protection according to the output of the corresponding overcurrent detection circuit 150_#. In the second mode, only the first overcurrent detection circuit 150_1 is enabled, and the second overcurrent detection circuit 150_2 is disabled. The two circuit blocks BLK1 and BLK2 each execute overcurrent protection according to the output of the first overcurrent detection circuit 150_1.

In the second mode, only the first overcurrent detection circuit 150_1 is enabled, thereby allowing power consumption to be reduced. Furthermore, if the two overcurrent detection circuits 150_1 and 150_2 are both used in the second mode, in a case in which there is variation in the detection condition or response speed between them, this leads to the occurrence of inconsistency in the operation. In order to solve such a problem, only one from among the overcurrent detection circuits, i.e., only the overcurrent detection circuit 150_1, is enabled. This solves such an inconsistency.

The first overcurrent detection circuit 150_1 is configured to be capable of comparing the voltage $V_{DS1}$ that occurs across both ends of the first high-side transistor MH1 with a first threshold voltage $\Delta V_{OCP1}$ that corresponds to the first overcurrent threshold value $I_{OCP1}$. The second overcurrent detection circuit 150_2 is configured in the same manner. In the second mode, the first threshold voltage $\Delta V_{OCP1}$ is scaled. In the second mode, the two high-side transistors MH1 and MH2 are coupled in parallel. In this state, the on resistance of the pair of high-side transistors becomes one-half. Accordingly, the first threshold voltage $\Delta V_{OCP1}$ is scaled according to such a state, thereby enabling correct overcurrent judgment.

The first overcurrent detection circuit 150_1 includes a replica transistor 152, a current source 154, and a comparator 156. The replica transistor 152 is configured as a replica of the first high-side transistor MH1. The source, which is one end of the replica transistor 152, is coupled to a VIN1 pin. The gate of the replica transistor 152 is biased such that it becomes the same state as that of the first high-side transistor MH1. The current source 154 is coupled to the other end (drain) of the replica transistor 152, and supplies current to the replica transistor 152. The voltage $\Delta V_{OCP1}$ across both ends of the replica transistor 152 is defined according to the current generated by the current source 154.

The comparator 156 compares the voltage across both ends (drain-source voltage) of the first high-side transistor with the voltage $\Delta V_{OCP}$ across both ends of the replica transistor 152. There is a difference in the amount of current generated by the current source 154 between the first mode and the second mode.

The current source 154 may include a constant current source 154a and a current DAC 154b. The sum total of the currents output from the constant current source 154a and the current DAC 154b may be supplied to the replica transistor 152. By switching the digital input value to be input to the current DAC 154b between the digital input value in the first mode and the digital input value in the second mode, the threshold value $\Delta V_{OCP1}$ can be scaled.

Peak Current Detection

In a case of employing a peak-current-mode feedback controller, or in order to provide Pulse Frequency Modulation (PFM) control (which will also be referred to as "intermittent-mode control") in a light load state, a peak current detection circuit is provided for detecting whether or not the current that flows through the high-side transistor reaches a predetermined peak current.

Figure 7A:
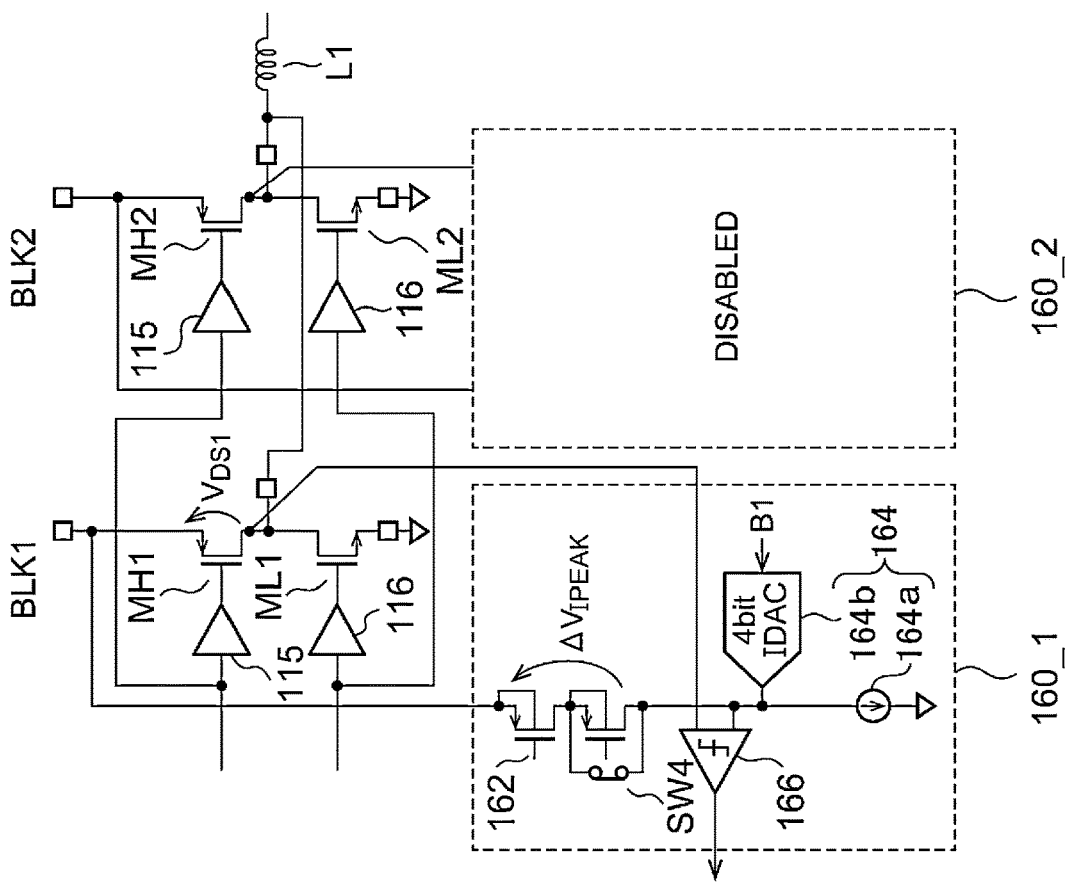
FIG. 7A and FIG. 7B are circuit diagrams each showing a peak current detection circuit.
Figure 7B:
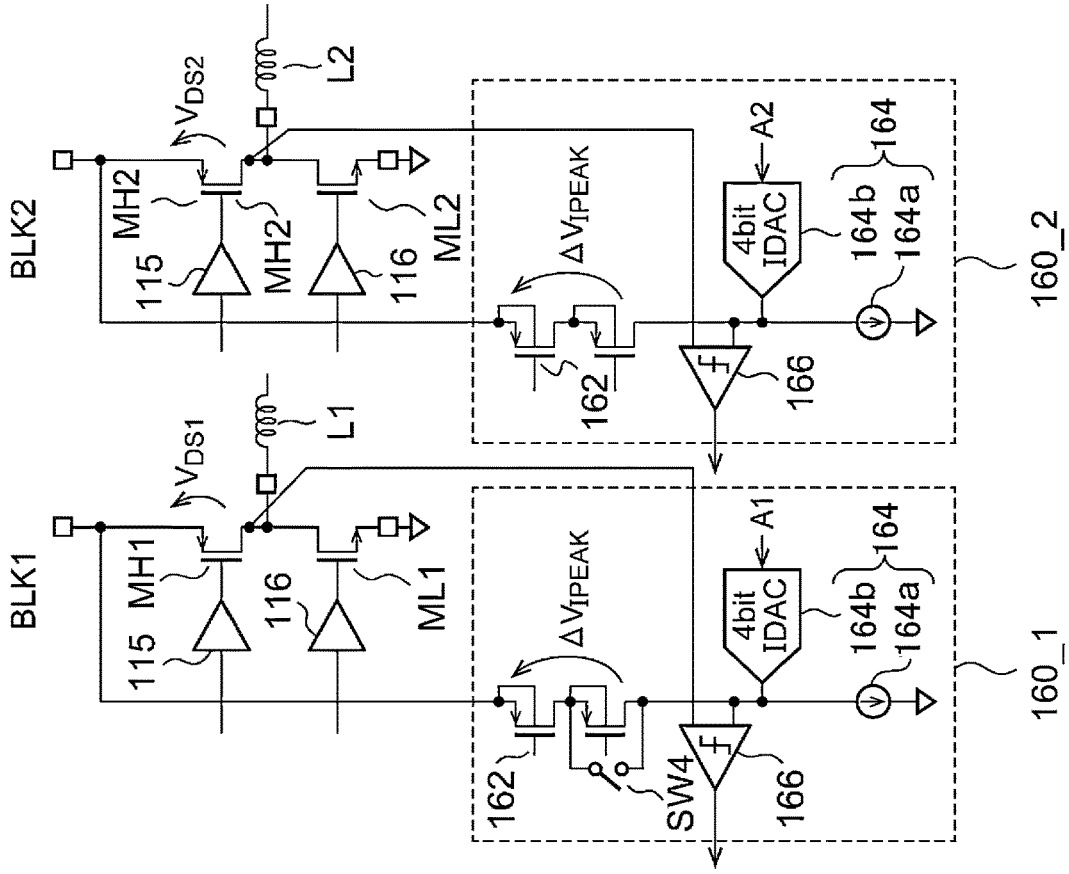

FIG. 7A and FIG. 7B are circuit diagrams each showing a peak current detection circuit. FIG. 7A shows a state in the first mode, and FIG. 7B shows a state in the second mode. The first circuit block BLK1 and the second circuit block BLK2 each include a first peak current detection circuit 160_1 and a second peak current detection circuit 160_2.

The first peak current detection circuit 160_1 compares the current $I_{MH1}$ that flows through the first high-side transistor MH1 with a first peak threshold value $I_{PEAK1}$. The second peak current detection circuit 160_2 compares the current $I_{MH2}$ that flows through the second high-side transistor MH2 with a second peak threshold value $I_{PEAK2}$.

In the first mode, the first peak current detection circuit 160_1 and the second peak current detection circuit 160_2 are enabled. In this state, each circuit block BLK_# ("#"=1, 2) operates according to the output of the corresponding peak current detection circuit 160_#.

In the second mode, only the first peak current detection circuit 160_1 is enabled, and the second peak current detection circuit 160_2 is disabled. The two circuit blocks BLK1 and BLK2 each operate according to the output of the first peak current detection circuit 160_1.

In the second mode, only the first peak current detection circuit 160_1 is enabled, thereby allowing power consumption to be reduced. Furthermore, if the two peak current detection circuits are both used in the second mode, in a case in which there is variation in the detection condition or response speed between them, this leads to the occurrence of inconsistency in the operation. In order to solve such a problem, only one from among the peak current detection circuits is enabled. This solves such an inconsistency.

The first peak current detection circuit 160_1 is configured to be capable of comparing the voltage $V_{DS1}$ that occurs across both ends of the first high-side transistor MH1 with a threshold voltage $\Delta V_{IPEAK1}$ that corresponds to the first peak threshold value $I_{PEAK1}$. The peak current detection circuit 160_2 is configured in the same manner. In the second mode, the threshold voltage $\Delta V_{IPEAK1}$ is scaled. In the second mode, the two high-side transistors MH1 and MH2 are coupled in parallel. In this state, the on resistance of the pair of high-side transistors becomes one-half. Accordingly, the first threshold voltage $\Delta V_{IPEAK1}$ is scaled according to such a state, thereby enabling correct peak current detection.

The peak current detection circuits 160_1 and 160_2 may be configured in the same manner as the overcurrent detection circuits 150_1 and 150_2. The first peak current detection circuit 160_1 includes a replica transistor 162, a current source 164, and a comparator 166. The replica transistor 162 includes multiple transistor elements coupled in series, and is configured such that a part of the multiple transistor elements can be bypassed by means of a switch SW41 in the second mode. Upon turning on the switch SW41, the voltage drop that occurs across the replica transistor 162 becomes one-half, thereby appropriately scaling the threshold voltage $V_{IPEAK1}$. The current source 164 includes a constant current source 164a and a current DAC 164b.

Zero Current Detection and Negative Current Detection

With a synchronous rectification DC/DC converter, if a reverse current is applied to the low-side transistor configured as a rectification element, this leads to degradation of efficiency. In order to solve this problem, in some cases, a control method is employed in which, when the occurrence of a zero-crossing is detected in the current that flows through the low-side transistor, or when a negative current is detected, the low-side transistor is forcibly turned off, thereby transiting to the diode rectification mode.

Alternatively, applications are known that are configured to allow a situation in which negative current (reverse current) is applied to the low-side transistor. In this case, when such a reverse current that flows through the low-side transistor becomes very large, this leads to a problem of heat generation or the like. Furthermore, if the high-side transistor or the low-side transistor is switched on and off in a state in which a large reverse current flows through the inductor, this induces a large voltage oscillation in the voltage at the LX pin or other voltages, which is an undesired situation. In order to solve such a problem, a Negative Current Protection (NCP) function is implemented on a control circuit employed in such an application that allows reverse current.

The common point between the zero current detection and the negative current detection is that the current that flows through the low-side transistor is compared with a threshold value of zero or a negative value.

FIG. 8A and FIG. 8B are circuit diagrams each showing a low-side current detection circuit. The monitoring of the current flowing through the low-side transistor ML does not require as severe a precision as the overcurrent detection and the peak current detection. Accordingly, in an example, only the first circuit block BLK1 is provided with a low-side current detection circuit 170_1. In contrast, the second block BLK2 is provided with no low-side current detection circuit. FIG. 8A shows a state in the first mode, and FIG. 8B shows a state in the second mode.

The low-side current detection circuit 170_1 compares the current $I_{ML1}$ that flows through the first low-side transistor ML1 with a threshold of zero or a negative value in the vicinity of zero. The low-side current detection circuit 170 is configured as a voltage comparator with offset. The low-side current detection circuit 170 compares the drain voltage of the first low-side transistor ML1 with the source voltage thereof.

The low-side current detection circuit 170_1 includes a differential amplifier 172 with offset and a voltage comparator 174. The differential amplifier 172 includes a tail current source 172a, an input differential pair 172b, and a resistance load 172c. The resistance load 172c is configured such that its resistance value can be switched according to the mode.

As shown in FIG. 8A, in the first mode, the output of the low-side current detection circuit 170_1 is supplied to the first feedback controller 110_1 and the second feedback controller 110_2. As shown in FIG. 8B, in the second mode, the output of the low-side current detection circuit 170_1 is supplied to the first feedback controller 110_1.

In a case of using the low-side current detection circuit 170_1 for providing zero-crossing detection, the switches SW51 and SW52 are turned off. In a case of using the low-side current detection circuit 170_1 for providing the NCP function, one from among the switches SW51 and SW52 is turned on so as to provide an offset, thereby allowing a negative threshold value to be set. By switching the on/off states of the switches SW51 and SW52, this arrangement allows the threshold value to be scaled.

Layout

Next, description will be made regarding a desired layout of the power management circuit 100. In the second mode, the two circuit blocks BLK1 and BLK2 are coupled to a common inductor. The circuit blocks BLK1 and BLK2 are required to operate at substantially the same timing.

Figure 9:
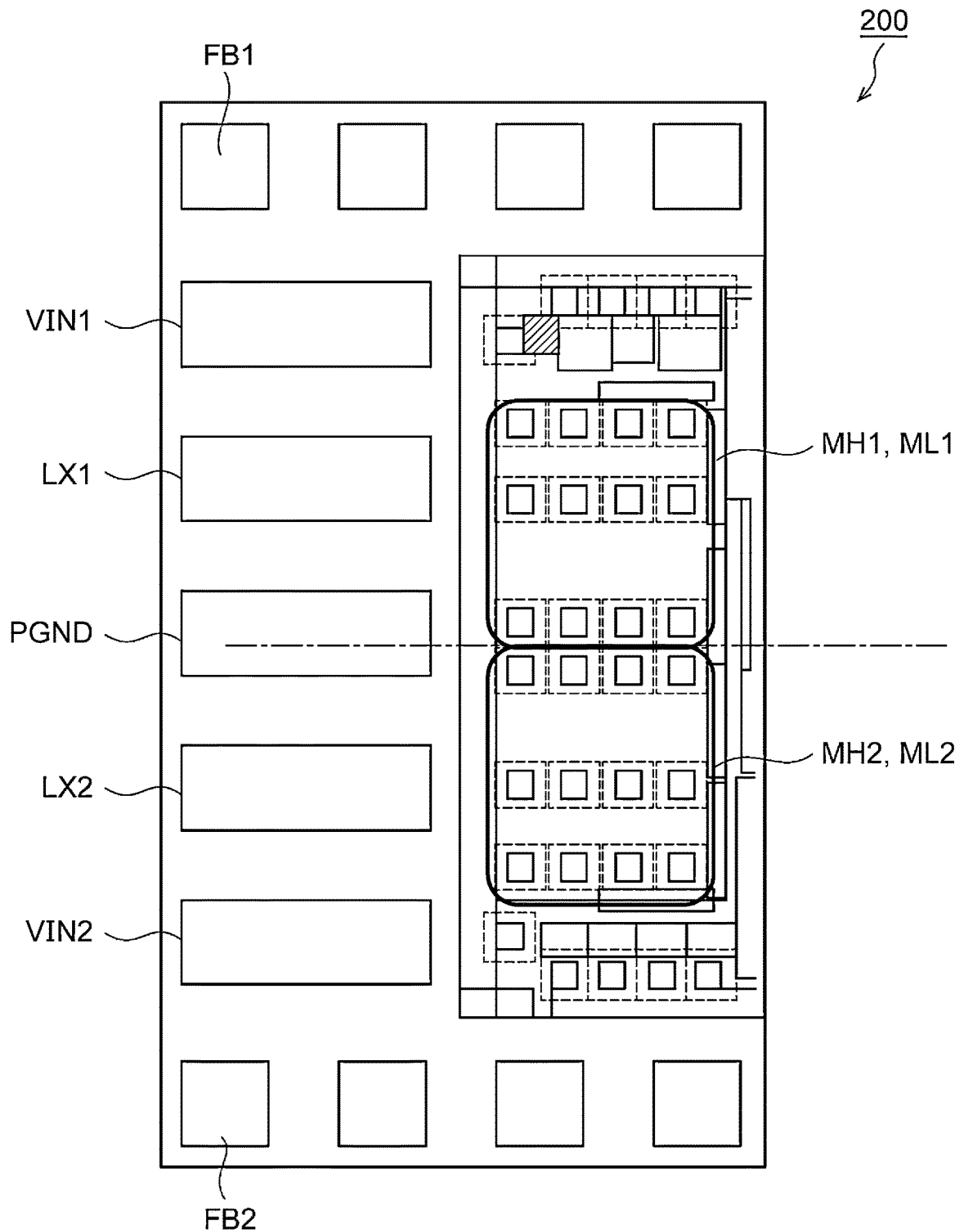
FIG. 9 is a layout diagram showing a power management circuit.

FIG. 9 is an exemplary layout diagram showing the power management circuit 100. The two circuit blocks BLK1 and BLK2 are laid out such that they are mirror images of each other. This allows the impedance between the circuit block BLK1 and the inductor L1 and the impedance between the circuit block BLK2 and the inductor L1 to match each other.

Furthermore, the ground pin PGND1 of the circuit block BLK1 and the ground pin PGND2 of the circuit block BLK2 are configured as a common ground pin (PGND pin). The common ground pin is arranged in a boundary portion between the two blocks. This allows the distance between the LX1 pin and the LX2 pin to be reduced. With this, in a case in which the LX1 pin and the LX2 pin are coupled to a common inductor, such an arrangement allows the impedance difference to be reduced. It should be noted that such a mirror-image layout of the two circuit blocks BLK1 and BLK2 is not necessarily required.

Application

Figure 10A:
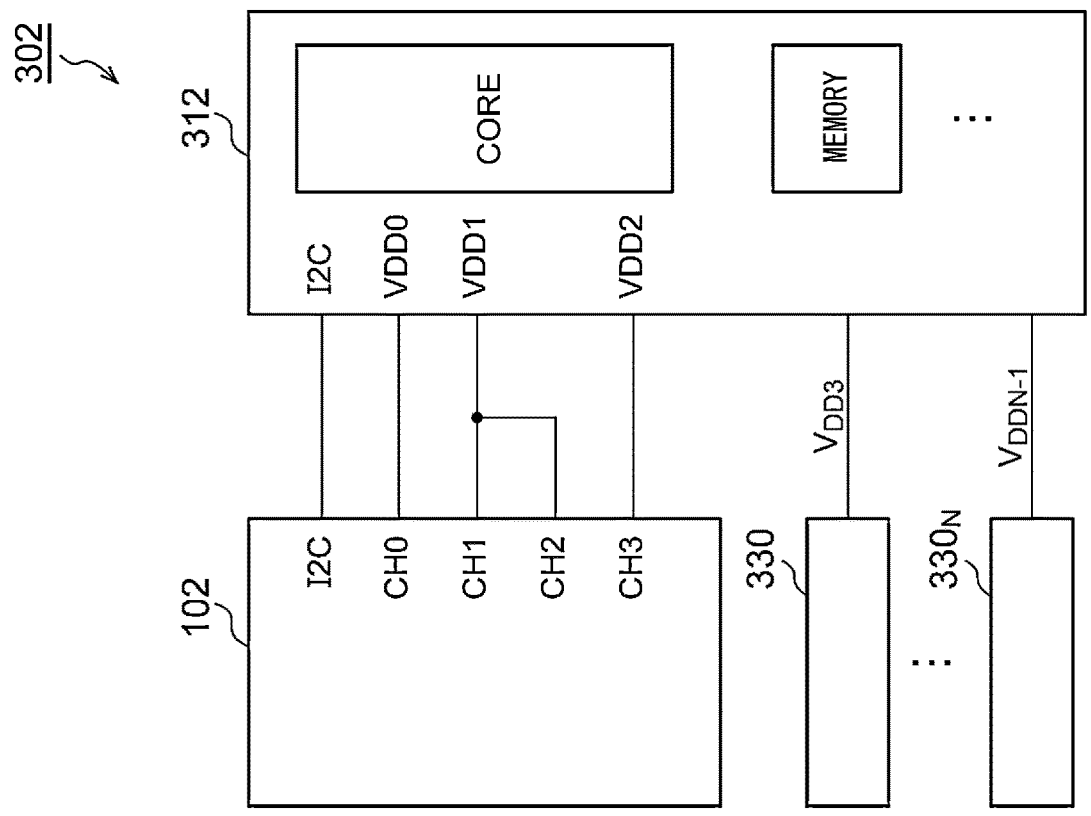
FIG. 10A and FIG. 10B are block diagrams each showing an electronic device including a power management circuit.
Figure 10B:
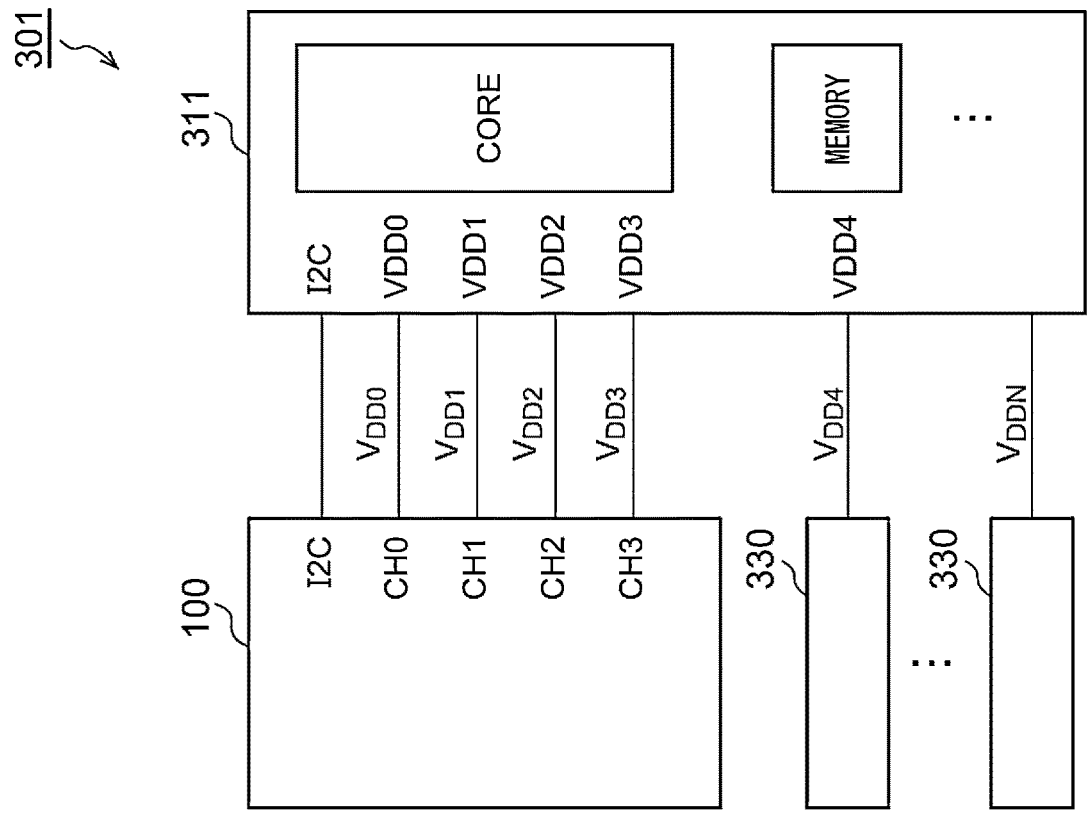

FIG. 10A and FIG. 10B are block diagrams each showing an electronic device including a power management circuit. FIG. 10A shows an electronic device 301 including a first platform. FIG. 10B shows an electronic device 302 including a second platform. In FIG. 10A and FIG. 10B, external inductors and capacitors are not shown.

Description will be made with reference to FIG. 10A. The electronic device 301 includes a SOC 311, the power management circuit 100 that supplies a power supply voltage to the SOC 311, and multiple power supply circuits 330.

The power management circuit 100 includes a DC/DC converter controller with four channels CH0 through CH3. Two channels CH1 and CH2 from among the four channels CH0 through CH3 are configured using the architecture described above. The remaining two channels CH0 and CH3 operate independently.

The SOC 311 includes a core 320, memory 322, and other blocks. The power management circuit 100 mainly supplies a power supply voltage to the core 320. The other power supply circuits 330 supply a power supply voltage to the memory 322 and the other blocks.

The SOC 311 employed in the platform shown in FIG. 10A is provided with four independent power supply pins VDD0 through VDD3. In this case, the power management circuit 100 is set to the first mode. In this mode, the two channels CH1 and CH2 operate independently. Accordingly, the power management circuit 100 operates as a four-channel DC/DC converter.

The SOC 312 employed in the platform shown in FIG. 10B is provided with three independent power supply pins. One from among the three power supply pins, i.e., VDD1, supports an amount of current that is larger than those of the other channels. In this case, the power management circuit 100 is set to the second mode. In this mode, the two channels CH1 and CH2 operate as a single channel Overall, the power management circuit 100 operates as a three-channel DC/DC converter.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

Modification 1

Description has been made assuming that the first circuit block BLK1 and the second circuit block BLK2 are configured as a single core. However, the present invention is not restricted to such an arrangement.

For example, the first output stage including the first high-side transistor and the first low-side transistor of the first circuit block and the second output stage including the second high-side transistor and the second low-side transistor of the second circuit block may be designed as a single core. In this case, the two output stages may preferably be laid out on a semiconductor chip such that they are mirror images of each other.

Alternatively, a portion including the first output stage and the first pre-driver and a portion including the second output stage and the second pre-driver may be designed as a single core. In this case, the two portions may be laid out on a semiconductor chip such that they are mirror images of each other.

Also, there may be a difference in the size of the power transistor MH (ML) that corresponds to the output stage between the two circuit blocks BLK1 and BLK2.

Modification 2

Description has been made in the embodiment regarding an arrangement in which the power management circuit 100 includes, as a built-in component, a power transistor included in the output stage of the DC/DC converter. However, the present invention is not restricted to such an arrangement. Also, such a power transistor may be provided as an external discrete component.

Modification 3

The number of output channels of the power management circuit 100 is not restricted in particular. In a case in which the power management circuit 100 includes four channels CH0 through CH3, a pair of the channels CH0 and CH1 and a pair of the channels CH2 and CH3 may be respectively configured as the two circuit blocks BLK1 and BLK2 described above. This allows the output of the power management circuit 100 to be switched between two-channel and four-channel. Such an arrangement is capable of supporting more kinds of platforms.

Modification 4

Description has been made with reference to FIG. 6A and FIG. 6B (or FIG. 7A and FIG. 7B) regarding an arrangement in which, in the second mode, the second overcurrent detection circuit 150_2 (or the second peak detection circuit 160_2) on the slave side is disabled. However, the present invention is not restricted to such an arrangement. Also, such a detection circuit may be operated in parallel with the first overcurrent detection circuit 150_1 (or the first peak current detection circuit 160_1) on the master side. In this case, one from among the outputs of the two detection circuits 150_1 and 150_2 (160_1 and 160_2) that shows a quicker response may be used to provide a control operation or a protection operation.

Modification 5

Description has been made in the embodiment regarding a two-channel arrangement. However, the present invention is also applicable to an arrangement in which the number of channels N is a desired integer of three or more. In this case, an arrangement may be made configured to select a mode from among a mode in which all N channels are operated independently and a mode in which M channels (M≤N) from among the N channels are coupled to a common inductor, and one from among the M channels is operated as a master while the remaining channels are operated as slaves.

Modification 6

Description has been made in the embodiment regarding an arrangement in which the first block BLK1 is fixedly set as a master and the second circuit block BLK2 is fixedly set as a slave. However, the present invention is not restricted to such an arrangement. Also, an arrangement may be made configured to support a third mode in which the second circuit block BLK2 is operated as a master and the first circuit block BLK1 is operated as a slave. In this case, in order to support the third mode, an additional signal path may be provided for transmitting a feedback control signal from the second circuit block BLK2 to the first circuit block BLK1. Furthermore, yet another additional signal path may preferably be provided for transmitting a control signal $S_{CTRL4}$ for dead-time control (through-current prevention) from the first circuit block BLK1 to the second circuit block BLK2.

The mode selector 130 may be configured to select one from among the first mode through the third mode. For example, the mode selector 130 shown in FIG. 4 may be provided to the FB1 pin side as an additional component. With this, by making a combination of electrical states of the FB1 pin and the FB2 pin, the mode may be selected from among the first mode through the third mode. The #-th FB #pin ("#"=1, 2) can be recognized as a pin for specifying the master or slave with respect to the corresponding block BLK #. In this case, the mode and the pin state may be associated as follows.

(i) First mode
The FB1 pin and the FB2 pin are both master.
(ii) Second mode
The FB1 pin is master, and the FB2 pin is slave.
(iii) Third mode
The FB1 pin is slave, and the FB2 pin is master.

Modification 7

Description has been made in the embodiment regarding an arrangement in which only the first low-side transistor side is provided with the low-side current detection circuit. However, the present invention is not restricted to such an arrangement. Also, both the first low-side transistor and the second low-side transistor may each be provided with a low-side current detection circuit.

Description has been made regarding the present disclosure with reference to the embodiments using specific terms. However, the above-described embodiments show only an aspect of the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A power management integrated circuit (IC) comprising:
   a first feedback pin;
   a second feedback pin;
   a first circuit block comprising a first feedback controller and a first pre-driver; and
   a second circuit block comprising a second feedback controller and a second pre-driver,
   wherein the power management IC is integrated on a semiconductor substrate, wherein the first feedback controller is structure to generate a first control signal which is a pulse signal of which duty cycle is adjusted such that a signal at the first feedback pin approaches to a first reference voltage in a first mode and a second mode, and to supply a third control signal according to the first signal to the second pre-driver in the second mode, and wherein
   the first pre-driver is structured to operate according to the first control signal in the first mode and the second mode, and wherein
   the second feedback controller is structured to generate a second control signal which is a pulse signal of which duty cycle is adjusted such that a signal at the second feedback pin approaches to a second reference voltage in the first mode, and wherein
   the second pre-driver is structured to operate according to the second control signal in the first mode and to operate according to the third control signal received from the first circuit block in the second mode.

2. The power management IC according to claim 1, wherein, in the second mode, an operation of the second feedback controller is stopped.

3. The power management IC according to claim 1, further comprising a mode selector structured to select one from among the first mode and the second mode based on an electrical state of the second feedback pin.

4. The power management IC according to claim 1, wherein the first circuit block and the second circuit block are structured as a single core.

5. The power management IC according to claim 1, further comprising a signal path structured to allow a signal for dead-time control to be transmitted between the first pre-driver and the second pre-driver in the second mode.

6. The power management IC according to claim 1, further comprising:
   a first input pin;
   a first output pin;
   a first ground pin;
   a second input pin;
   a second output pin; and
   a second ground pin,
   wherein the first circuit block further comprises:
      a first high-side transistor arranged between the first input pin and the first output pin; and
      a first low-side transistor arranged between the first output pin and the first ground pin,
   and wherein the second circuit block further comprises:
      a second high-side transistor arranged between the second input pin and the second output pin; and
      a second low-side transistor arranged between the second output pin and the second ground pin.

7. The power management IC according to claim 6, further comprising:
   a first overcurrent detection circuit structured to compare a current that flows through the first high-side transistor with a first overcurrent threshold value; and
   a second overcurrent detection circuit structured to compare a current that flows through the second high-side transistor with a second overcurrent threshold value,
   wherein, in the first mode, the first overcurrent detection circuit and the second overcurrent detection circuit are enabled,
   and wherein, in the second mode, the first overcurrent detection circuit is enabled, and the second overcurrent detection circuit is disabled.

8. The power management IC according to claim 7, wherein the first overcurrent detection circuit is structured to be capable of comparing a voltage across both ends of the first high-side transistor with a first threshold voltage that corresponds to the first overcurrent threshold value, and wherein, in the second mode, the first threshold voltage is scaled.

9. The power management IC according to claim 7, wherein the first overcurrent detection circuit comprises:
a first replica transistor arranged such that one end thereof is coupled to the first input pin;
a current source coupled to the other end of the first replica transistor, and structured to supply a current to the first replica transistor; and
a comparator structured to compare a voltage across both ends of the first high-side transistor with a voltage across both ends of the first replica transistor.

10. The power management IC according to claim 9, wherein there is a difference in an amount of current generated by the current source between the first mode and the second mode.

11. The power management IC according to claim 6, further comprising:
a first peak current detection circuit structured to compare a current that flows through the first high-side transistor with a first peak threshold value; and
a second peak current detection circuit structured to compare a current that flows through the second high-side transistor with a second peak threshold value,
wherein, in the first mode, the first peak current detection circuit and the second peak current detection circuit are enabled,
and wherein, in the second mode, the first peak current detection circuit is enabled, and the second peak current detection circuit is disabled.

12. The power management IC according to claim 11, wherein the first peak current detection circuit is structured to be capable of comparing a voltage across both ends of the first high-side transistor with a second threshold voltage that corresponds to the first peak threshold value,
and wherein, in the second mode, the second threshold voltage is scaled.

13. The power management IC according to claim 11, wherein the first peak current detection circuit comprises:
a second replica transistor arranged such that one end thereof is coupled to the first input pin;
a current source coupled to the other end of the second replica transistor, and structured to supply a current to the second replica transistor; and
a comparator structured to compare a voltage across both ends of the first high-side transistor with a voltage across both ends of the second replica transistor.

14. The power management IC according to claim 13, wherein the second replica transistor comprises a plurality of transistor elements coupled in series,
and wherein, in the second mode, a part of the plurality of transistor elements are bypassed.

15. The power management IC according to claim 6, further comprising a low-side current detection circuit structured to compare a current that flows through the first low-side transistor with a threshold value of zero,
wherein, in the first mode, the first feedback controller and the second feedback controller respectively generate the first control signal and the second control signal according to an output of the low-side current detection circuit,
and wherein, in the second mode, the first feedback controller generates the first control signal according to an output of the low-side current detection circuit.

16. The power management IC according to claim 15, wherein the threshold value of zero is shifted in the first mode and the second mode.

17. The power management circuit according to claim 6, wherein the first ground pin and the second ground pin are configured as a common ground pin.

18. The power management IC according to claim 6, wherein a first output stage comprising the first high-side transistor and the first low-side transistor of the first circuit block and a second output stage comprising the second high-side transistor and the second low-side transistor of the second circuit block are laid out in a mirror-image manner.

19. The power management IC according to claim 1, wherein a third mode can be selected in addition to the first mode and the second mode,
and wherein, in the third mode, the second feedback controller generates the second control signal based on a signal at the second feedback pin, the second pre-driver operates according to the second control signal, and the first pre-driver operates according to a fourth control signal received from the second circuit block.

20. A power management IC with N channels (N≥3), comprising:
N (N≥3) feedback pins; and
N circuit blocks each comprising a feedback controller and a pre-driver,
wherein the power management IC is integrated on a semiconductor substrate,
wherein, in a first mode in which N circuit blocks operate independently, in each circuit block, the feedback controller generates a first control signal which is a pulse signal of which duty cycle is adjusted such that a signal at the corresponding feedback pin approaches to a predetermined reference voltage, and the pre-driver operates according to the first control signal,
wherein, in a second mode in which M (<N) circuit blocks from among the N circuit blocks operate in a cooperative manner, (i) in a master circuit block, which is one from among the M circuit blocks, the feedback controller generates the first control signal which is a pulse signal of which duty cycle is adjusted such that a signal at the corresponding feedback pin approaches to a predetermined voltage and supply a third pulse signal according to the first pulse signal to the other M−1 circuit blocks, and the pre-driver operates according to the first control signal, and (ii) in the other M−1 circuit blocks other than the master circuit block, the pre-driver operates according to the third control signal received from the master circuit block,
and wherein the first mode and the second mode are switchable.

* * * * *